United States Patent [19]

Murai et al.

[11] 3,721,682
[45] March 20, 1973

[54] MANUFACTURE OF BENZYLIDENE SORBITOLS

[75] Inventors: Koichi Murai, Kyoto-fu; Giichi Akazome, Kyoto; Yasuo Choshi, Uji; Toshiaki Kobayashi, Kyoto; Atsuo Tsuji, Kyoto-fu, all of Japan

[73] Assignee: New Japan Chemical Company Limited, Fushimi-ku, Kyoto-shi, Japan

[22] Filed: Oct. 5, 1970

[21] Appl. No.: 78,207

[52] U.S. Cl.............................260/340.7, 260/340.9
[51] Int. Cl. .......................C07d 13/04, C07d 15/04
[58] Field of Search..........................260/340.7, 340.9

[56] References Cited

OTHER PUBLICATIONS

Hagiwara, "Chemical Abstracts," Vol. 47 (1953), Col. 3235g.
Endo, "J. Pharm. Soc. Japan," Vol. 79(5), 1959, pp. 603–606.

Primary Examiner—Alex Mazel
Assistant Examiner—James H. Turnipseed
Attorney—Larson, Taylor and Hinds

[57] ABSTRACT

In reacting an aqueous solution of sorbitol with benzaldehyde in the presence of a dehydrating catalyst to produce a benzylidene sorbitol, a method of this invention comprises adding cyclohexane to the reaction system in an amount of five to 20 weight parts based on one weight part of the benzaldehyde, heating with stirring the reaction system to effect the reaction between sorbitol and benzaldehyde while boiling an azeotropic mixture of cyclohexane and water, said azeotropic mixture being condensed and separated to remove the water from the reaction system and recycle the cyclohexane to the system, and recovering the resultant benzylidene sorbitol thus produced.

6 Claims, No Drawings

MANUFACTURE OF BENZYLIDENE SORBITOLS

This invention relates to manufacture of benzylidene sorbitols, and more particularly to an improved method for manufacturing benzylidene sorbitols by reacting an aqueous solution of sorbitol with benzyldehyde.

It is well known in the art that benzylidene sorbitols cause various organic solvents to undergo gellation to produce soft or hard gel, and therefore they are used in preparing gelly-like products or solidified organic liquid such as solid alcohol, etc.

The benzylidene sorbitol is generally produced by reacting an aqueous solution of sorbitol with benzaldehyde in the presence of a dehydrating catalyst. Since this reaction is benzalification reaction which produces water, the presence of water in the reaction system results in an adverse effect upon the reaction, requiring a prolonged period for reaction and lowering the yield. Indeed, in accordance with a conventional method the reaction takes a long period of about 12 to 24 hours and it is difficult to obtain an yield which exceeds 70 percent. When the amount of water used in the above method is reduced to improve the yield, the reaction mixture tends to be solidified due to the production of water-insoluble benzylidene sorbitol, while if an organic solvent is used as a reaction medium in place of water, the benzylidene sorbitol produced acts to gel the reaction mixture, with the result that the reaction can hardly proceed effectively in either of these cases. The conventional method is further defective in that the use of the dehydrating catalyst causes the resultant benzylidene sorbitol to be colored, thereby deteriorating the commercial value of the product.

The present invention has eliminated the aforementioned drawbacks of the conventional method. An object of this invention is to provide a novel method for producing a high yield of benzylidene sorbitols in much shorter period of time than heretofore possible.

Another object of this invention is to provide a method for producing benzylidene sorbitols by reacting sorbitol with benzaldehyde effectively without solidification or gellation of the reaction mixture.

Another object of the present invention is to provide a method for producing benzylidene sorbitols in the form of white grains free from coloring.

Still another object of the present invention is to provide a method for selectively producing a mixture of mono- and di- benzylidene sorbitols, di-benzylidene sorbitol, tribenzylidene sorbitol, or a mixture of di- and tri-benzylidene sorbitols.

The above and other objects of this invention will be apparent from the following description.

In reacting an aqueous solution of sorbitol with benzaldehyde in the presence of a dehydrating catalyst to produce a benzylidene sorbitol, the present method is characterized by 1. adding cyclohexane to the reaction system in an amount of five to 20 weight parts, based on 1 weight part of the benzaldehyde.
2. heating with stirring the reaction system to effect the reaction between sorbitol and benzaldehyde while boiling an azeotropic mixture of cyclohexane and water, said azeotropic mixture being condensed and separated to remove the water from the reaction system and recycle the cyclohexane to the system, and
3. recovering the resultant benzylidene sorbitol thus produced.

In accordance with the researches of the present inventors, it has been found that when an aqueous solution of sorbitol is reacted with benzaldehyde in the presence of cyclohexane added to the reaction system to produce benzylidene sorbitols, the cyclohexane serves as a reaction medium to enable the reaction to proceed smoothly while also enabling the water content of the aqueous sorbitol solution and the water produced in the course of the reaction to be removed from the system in the form of azeotropic mixture, since cyclohexane is not caused to gel by benzylidene sorbitols unlike other organic solvents, and further it forms azeotropic mixture with water. In accordance with this invention, the azeotropic mixture is separated into water and cyclohexane upon condensation, and the water is then removed from the system while the cyclohexane recovered is recycled into the system, the above effects of cyclohexane thus being ensured.

The continuous removal of the water produced by the reaction therefore allows the reaction to proceed effectively, making it possible to obtain a high yield of the objective benzylidene sorbitols within a much shorter period of time than was the case with the conventional method. In fact, in accordance with the present invention, benzylidene sorbitols can be obtained within 5 to 7 hours in a yield of higher than 75 percent. Since cyclohexane does not undergo gellation by benzylidene sorbitols and can be used by recirculation, it is always present in the reaction system without producing gellation or solidification of the reaction mixture, with the result that benzylidene sorbitols can be obtained in the form of white grains which are free from coloring caused by the dehydrating catalyst. In accordance with this invention, it is further possible to selectively obtain a mixture of mono- and di-benzylidene sorbitols, dibenzylidene sorbitol, tribenzylidene sorbitol, or a mixture of di- and tri-benzylidene sorbitols depending upon the moles of the benzaldehyde used relative to the starting sorbitol. These products all cause gellation in various organic solvents. Accordingly, the suitable of the above products may be selectively produced in accordance with the application purposes.

The amount of the benzaldehyde used in the present invention may be determined depending upon the particular kind of the product to be obtained. When 2 moles of benzaldehyde is used per mole of sorbitol, dibenzylidene sorbitol may be obtained selectively, while the use of 3 moles of the former per mole of the latter results in selective production of tribenzylidene sorbitol. Even where the amount of the benzaldehyde is further increased, it is impossible to obtain a product which is benzalified to a greater extent than tribenzylidene sorbitol. However, the increase of benzaldehyde amount exceeding 3 moles per mole of sorbitol tends to increase the reaction velocity, but benzaldehyde may usually be used in an amount of not more than 3.2 moles per mole of sorbitol. The results of the researches by the inventors show that if benzaldehyde is used in an amount less than 2 moles per mole of sorbitol, a mixture is obtained in which dibenzylidene sorbitol is predominant with a minor amount of monobenzylidene sorbitol. In fact, even where benzaldehyde is used in an equimolar amount relative to sorbitol, the resultant product is found to contain a greater amount of dibenzylidene sorbitol than monobenzylidene sorbitol. With further increase of the amount of benzaldehyde, this tendency is progressively pronounced, and the use of 2 moles of benzaldehyde per mole of sorbitol results in a product which consists substantially of dibenzylidene sorbitol alone. As the amount of benzaldehyde increases from 2 moles to 3 moles, the amount of dibenzylidene sorbitol produced decreases correspondingly with increase in the amount of tribenzylidene sorbitol. That is, a mixture of dibenzylidene sorbitol and tribenzylidene sorbitol is obtained when 2 to 3 moles of benzaldehyde is used. The ratio of the dibenzylidene sorbitol to tribenzylidene sorbitol in the resultant mixture is decreased as the molar ratio of benzaldehyde to sorbitol is increased within the above range. A mixture containing dibenzylidene sorbitol and tribenzylidene sorbitol at an approximate mole ratio of 1 : 1 can be obtained when 2.5 moles of benzaldehyde is used per mole of sorbitol, and tribenzylidene sorbitol is selectively produced when 3 moles or more of benzaldehyde is used. Thus benzaldehyde may be used in the invention in the range of 1 to 3.2 moles per mole of sorbitol, depending on the kind of the desired benzales, i.e., a mixture of mono- and di-benzylidene sorbitols, dibenzylidene sorbitol, tribenzylidene sorbitol or a mixture of di- and tri-benzylidene sorbitols. Preferable amount of benzaldehyde used is in the range of 1.8 to 3.0 moles per mole of sorbitol, in which range di- or tri-benzylidene sorbitol or a mixture thereof is obtainable selectively.

In the present invention cyclohexane is used as a reaction medium, but the starting material, sorbitol, is insoluble in the cyclohexane, so that the sorbitol is employed in the form of aqueous solution as in conventional methods. In general it is preferable to use an aqueous solution of sorbitol having a concentration of 60 to 80 weight percent.

In the present invention cyclohexane may be used in an amount of 5 to 20 times, preferably 8 to 15 times, the weight of the benzaldehyde used. The cyclohexane and water form an azeotropic mixture containing cyclohexane and water at a weight ratio of 91 : 9 and boiling at 68.95°C. Therefore, when cyclohexane is added to the reaction system and the reaction mixture is heated with stirring, it forms an azeotropic mixture with water in the system and produced in the course of the reaction, allowing water to be taken out from the system with the result that the reaction proceeds effectively. The evaporated azeotropic mixture is condensed and separated into water and cyclohexane, the water being taken out from the system while cyclohexane is returned to the system.

Dehydrating catalysts used in the invention are those conventional in the art, such as concentrated sulfuric acid, 35 percent hydrochloric acid, 80 – 90 percent phosphoric acid, etc. The catalyst may be used in an amount of 0.1 to 10 weight percent, based on the combined weight of the starting sorbitol and benzaldehyde.

In the invention saturated hydrocarbons having six to 10 carbon atoms, such as hexane, octane, petroleum ether, etc., may be added to the reaction system as a diluent, when required. Such hydrocarbons do not adversly affect the azeotropic mixture of cyclohexane and water, and may be employed in an amount not higher than nine times the weight of the cyclohexane used.

According to the research of the present inventors, it has been found that when a water-soluble organic polar solvent is added to the system, the reaction is markedly accelerated without adverse effect on the reaction, making it possible to produce benzylidene sorbitols in a higher yield for a shorter period of reaction. Representative examples of such polar solvents are, for example, N,N-dimethyl formamide, dimethyl sulfoxide, dioxane, sulfolane, methanol, ethanol, propanol, butanol, etc. The polar solvents may be used alone or in admixture with one another in the range of 0.5 to 20 weight percent, preferably 1.0 to 10 weight percent, based on the weight of cyclohexane or the combined weight of cyclohexane and saturated hydrocarbon diluent. The best result may be obtained when alcohols such as methanol, ethanol, propanol and butanol are used in combination with dimethyl formamide or dimethyl sulfoxide. The mixing ratio by weight of the former and the latter varies over a wide range, but is in the range of 1 : 1 to 10 : 1.

According to one preferred embodiment of the present method, an aqueous solution of sorbitol, benzaldehyde and cyclohexane are placed in a reactor equipped with a thermometer, gas injection pipe, cooler with a decanter and stirrer. Saturated hydrocarbon diluent and/or water-soluble organic polar solvent may also be charged in the reactor, if required. The air in the reactor may preferably be replaced with nitrogen gas, argon gas or like inert gas. Thereafter the resultant mixture is thoroughly stirred, to which dehydrating catalyst is added, and heated with stirring to a boiling temperature of the azeotropic mixture. The stirring rate may vary over a wide range, but 50 to 200 r.p.m. may be preferable. By the heating the azeotropic mixture of cyclohexane and water in the system and produced in the course of the reaction is evaporated, and thus the system is maintained at a constant temperature. The evaporated mixture is condensed in a cooler and led into a decanter to be separated into cyclohexane and water. The water is taken out from the system, while the cyclohexane is continuously returned to the system for recirculation. Thus the cyclohexane is allowed to exist in the system in a constant amount, always serving for the removal of water from the system. The benzylidene sorbitol produced is precipitated in the form of white pearl-like grains. The reaction may usually be completed within a period of only 5 to 7 hours. After the reaction the system is cooled to room temperature, and the resultant slurry product is neutralized with an alkali, such as $Na_2CO_3$, NaOH, $K_2CO_3$, KOH, etc., washed with water, filtered and dried, whereby the desired benzylidene sorbitol can be obtained in the form of white pearl-like grains.

For a better understanding of the invention examples are given below, in which all percentages are by weight unless otherwise specified.

EXAMPLE 1

In a reactor equipped with a thermometer, gas injection pipe, cooler with a decanter and stirrer were placed 64 g of 70 percent aqueous solution of sorbitol, 53 g of benzaldehyde and 500 ml of cyclohexane, and the air in the reactor was replaced with nitrogen gas. Thereafter the resultant mixture was thoroughly stirred, to which 3 g of 98 percent sulfuric acid was slowly added. The system was heated to effect benzalification reaction while evaporating azeotropic mixture of water and cyclohexane. The evaporated mixture was condensed and led into a decanter, in which cyclohexane was separated from water. The water was taken out from the system and the cyclohexane was returned to the system. Thus water produced in the reaction was removed from the system all the time and the temperature of the system was maintained at about 68° to 73°C, boiling temperature of the azeotropic mixture. After 5 hours' reaction the resultant mixture was cooled to room temperature, neutralized with $NaCO_3$, washed with water, filtered, further washed with hot water for several times, and dried, whereby 64 g of dibenzylidene sorbitol was obtained in the form of white pearl-like grains. Yield was 72 mole percent. Acetal value of the product was 312.9 (calcd. value for dibenzylidene sorbitol was 312.6).

Elementary analysis thereof gave the following result:
Found:      C:67.05 % H:6.39 %
Calcd. for $C_{20}H_{22}O_6$:   C:67.03 % H:6.19 %

EXAMPLE 2

73.5 g of dibenzylidene sorbitol was prepared in the same manner as in Example 1, except that 15 ml of dimethylsulfoxide was placed in the reactor in combination with 500 ml of cyclohexane. Yield was 82.5 mole percent. Acetal value of the product was 311.1

EXAMPLE 3

In the same reactor as in Example 1 were placed 35 g of 70 percent aqueous solution of sorbitol, 43 g of benzaldehyde and 526 ml of cyclohexane, and the air in the reactor was replaced with nitrogen gas. The resultant mixture was thoroughly stirred, to which 0.47 g of 98 percent sulfuric acid was added. Thereafter the reaction was conducted for 7.5 hours in the same manner as in Example 1, whereby 51.2 g of tribenzylidene sorbitol was obtained in the form of white pearl-like grains. Yield was 85.0 mole percent Acetal value of the product was 376.5, corresponding to 377.0, calcd. value for tribenzylidene sorbitol and no absorption due to OH group was found by infrared spectroscopic analysis.

EXAMPLE 4

The benzarification reaction was conducted in the same manner as in Example 3, except that 6.0 g of dimethyl formamide and 9.0 g of methanol were placed in the reactor in combination with 526 ml of cyclohexane. After 6.5 hours reaction 58.9 g of tribenzylidene sorbitol was obtained in the form of white pearl-like grains. Yield was 97.6 mole percent. Acetal value of the product was 377.0, corresponding to calcd. value for tribenzylidene sorbitol and no absorption due to OH group was found by infrared spectroscopic analysis.

EXAMPLE 5

In the same reactor as in Example 1 were placed 35 grams of 70 percent aqueous solution of sorbitol, 35.6 g of benzaldehyde, 474 ml of cyclohexane, 5.5 g of dimethyl formamide and 10.0 g of butanol, and the air in the reactor was replaced with nitrogen gas. The resultant mixture was thoroughly stirred, to which 0.40 g of 98 percent sulfuric acid was added. Thereafter the reaction was conducted for 7.0 hours in the same manner as in Example 1, whereby 49.2 g of a mixture of dibenzylidene sorbitol and tribenzylidene sorbitol was obtained in the form of white pearl-like grains. Approximate ratio by mole of di- and tri-benzylidene sorbitols in the resultant product was about 1 : 1. Yield was 92.0 mole percent. Acetal value of the mixture was 348.5.

EXAMPLE 6

In the same reactor as in Example 1 were placed 35 g of 70 percent aqueous solution of sorbitol, 33.0 g of benzaldehyde, 300 ml of cyclohexane, 200 ml of petroleum ether, 6.0 g of dimethylformamide and 9.0 g of methanol, and the air in the reactor was replaced with nitrogen gas. The resultant mixture was thoroughly stirred, to which 0.53 g of 98 percent sulfuric acid was added. The reaction was conducted for 6.5 hours in the same manner as in Example 1, whereby 50.9 g of a mixture of dibenzylidene sorbitol and tribenzylidene sorbitol was obtained in the form of white pearl-like grains. Approximate ratio by mole of di-and tri-benzylidene sorbitols was bout 7 : 3. Yield was 98.0 mole percent and acetal value of the mixture was 335.2.

EXAMPLE 7

In the same reactor as in Example 1 were placed 35 g of 70 percent aqueous solution of sorbitol, 40.0 g of benzaldehyde, 510 ml of cyclohexane, 6.0 g of dimethyl formamide and 10.0 g of ethanol, and the air in the reactor was replaced with nitrogen gas. The resultant mixture was thoroughly stirred, to which 0.47 g of 98 percent sulfuric acid was added. The reaction was conducted for 6.5 hours in the same manner as in Example 1, whereby 56.8 g of a mixture of dibenzylidene sorbitol and tribenzylidene sorbitol was obtained in the form of white pearl-like grains. Approximate ratio by moles of di- and tri-benzylidene sorbitols was about 1 : 4. Yield was 98.0 mole percent and acetal value of the mixture was 362.5.

What we claim is:

1. In the reaction of an aqueous solution of sorbitol with benzaldehyde in the presence of a dehydrating catalyst to produce a benzylidene sorbitol, the improvement comprising
    adding cyclohexane to the reaction mixture in an amount of five to 20 weight parts based on one weight part of the benzaldehyde,
    heating with stirring the resulting reaction mixture to effect the reaction between sorbitol and benzaldehyde while evaporating off cyclohexane and water as an azeotropic mixture,
    condensing and separating said azeotropic mixture to remove water from the reaction,
    recycling separated cyclohexane to the reaction, and
    recovering the resultant benzylidene sorbitol thus produced.

2. The process of claim 1, in which said benzaldehyde is used in an amount of 1 to 3.2 moles per mole of the sorbitol.

3. the process of claim 1, in which said cyclohexane is used in an amount of 8 to 15 times the weight of the benzaldehyde.

4. The process of claim 1, in which said cyclohexane is added to the reaction system in combination with 0.5 to 20 weight percent of a water-soluble organic polar solvent, based on the weight of the cyclohexane, said water-soluble organic polar solvent being selected from the group consisting of N,N-dimethyl formamide, dimethyl sulfoxide, dioxane, sulfolane, methanol, ethanol, propanol, and butanol.

5. The process of claim 4, in which said water-soluble organic polar solvent is a mixture of (a) methanol, ethanol, propanol or butanol and (b) dimethylformamide or dimethyl sulfoxide.

6. The process of claim 4 in which said water-soluble organic polar solvent is used in an amount of 1.0 to 10 weight percent, based on the weight of the cyclohexane.

* * * * *

UNITED STATES PATENT OFFICE
CERTIFICATE OF CORRECTION

Patent No. 3,721,682             Dated March 20, 1973

Inventor(s) Koichi Murai, Giichi Akazome, Yasuo Choshi, Toshiaki Kobayashi and Atsuo Tsuji It is certified that error appears in the above-identified patent and that said Letters Patent are hereby corrected as shown below:

In the heading insert --

Claims priority of Japanese Application Serial No. 80076/69, filed October 6, 1969.

Signed and sealed this 25th day of December 1973

(SEAL)
Attest:

EDWARD M. FLETCHER, JR.  
Attesting Officer

RENE D. TEGTMEYER  
Acting Commissioner of Patents